US007725345B2

United States Patent
Furin et al.

(10) Patent No.: US 7,725,345 B2
(45) Date of Patent: May 25, 2010

(54) METHOD AND SYSTEM TO MANAGE ACHIEVING AN OBJECTIVE

(75) Inventors: Matthew Furin, Mooresville, NC (US); Scott Heslink, Fort Mill, SC (US); Kathryn L. Little, Huntersville, NC (US); Deborah Pierson, Jacksonville, FL (US); John D Stoutenger, Charlotte, NC (US); Vele J. Galovski, Pittsford, NY (US); Chad Heffron, Oakton, VA (US)

(73) Assignee: Sony Ericsson Mobile Communications AB, Lund (SE)

( * ) Notice: Subject to any disclaimer, the term of this patent is extended or adjusted under 35 U.S.C. 154(b) by 1558 days.

(21) Appl. No.: 10/905,135

(22) Filed: Dec. 17, 2004

(65) Prior Publication Data

US 2006/0136282 A1  Jun. 22, 2006

(51) Int. Cl.
*G06Q 10/00* (2006.01)
(52) U.S. Cl. ........................................... 705/10
(58) Field of Classification Search .................... 705/10
See application file for complete search history.

(56) References Cited

U.S. PATENT DOCUMENTS

| 6,430,539 | B1 | 8/2002 | Lazarus et al. | |
|---|---|---|---|---|
| 6,968,312 | B1* | 11/2005 | Jordan et al. | 705/7 |
| 7,219,068 | B2* | 5/2007 | Zelek et al. | 705/7 |
| 2002/0013720 | A1* | 1/2002 | Ozono et al. | 705/7 |
| 2003/0187675 | A1* | 10/2003 | Hack et al. | 705/1 |
| 2004/0039619 | A1* | 2/2004 | Zarb | 705/7 |
| 2004/0162752 | A1* | 8/2004 | Dean et al. | 705/10 |
| 2004/0199416 | A1* | 10/2004 | Heina et al. | 705/10 |

OTHER PUBLICATIONS

Timme, Stephen G., "Benchmarking Financial Performance Gaps: A Top-Down Approach" (2001), retrieved from http://www.finlistics.com/Benchmarking/TopDownArticle.html.*
Matzler, Kurt, and Hans H. Hinterhuber, "How to make product development projects more successful by integrating Kano's model of customer satisfaction into quality function deployment." Technovation, 18:1, (1998), pp. 25-38.*
S. K. Bhattacharyya & Zillur Rahman, "Capturing the Customer's Voice, the Centerpiece of Strategy Making: A Case Study in Banking." European Business Review 16:2 (2004). pp. 128-138.*
Michael Conklin, et al. "Customer Satisfaction Analysis: Identification of Key Drivers." European Journal of Operations Research 154 (2004). pp. 819-827.*
Kurt Matzler & Hans H. Hinterhuber, "How to Make Product Development Projects more Successful by Integrating Kano's Model of Customer Satisfaction into Quality Function Deployment." Technovation 18:1 (1998). pp. 25-38.*

* cited by examiner

*Primary Examiner*—Beth V Boswell
*Assistant Examiner*—Neil R Kardos
(74) *Attorney, Agent, or Firm*—Michael A. Springs; Moore & Van Allen, PLLC

(57) ABSTRACT

A method to manage achieving an objective may include collecting data related to the objective and determining a set of drivers related to the objective. The method may also include calculating a gap for each driver between a baseline and a goal for the objective. The method may further include analyzing the gap to associate a quantity of gap points with each driver to achieve the goal.

36 Claims, 12 Drawing Sheets

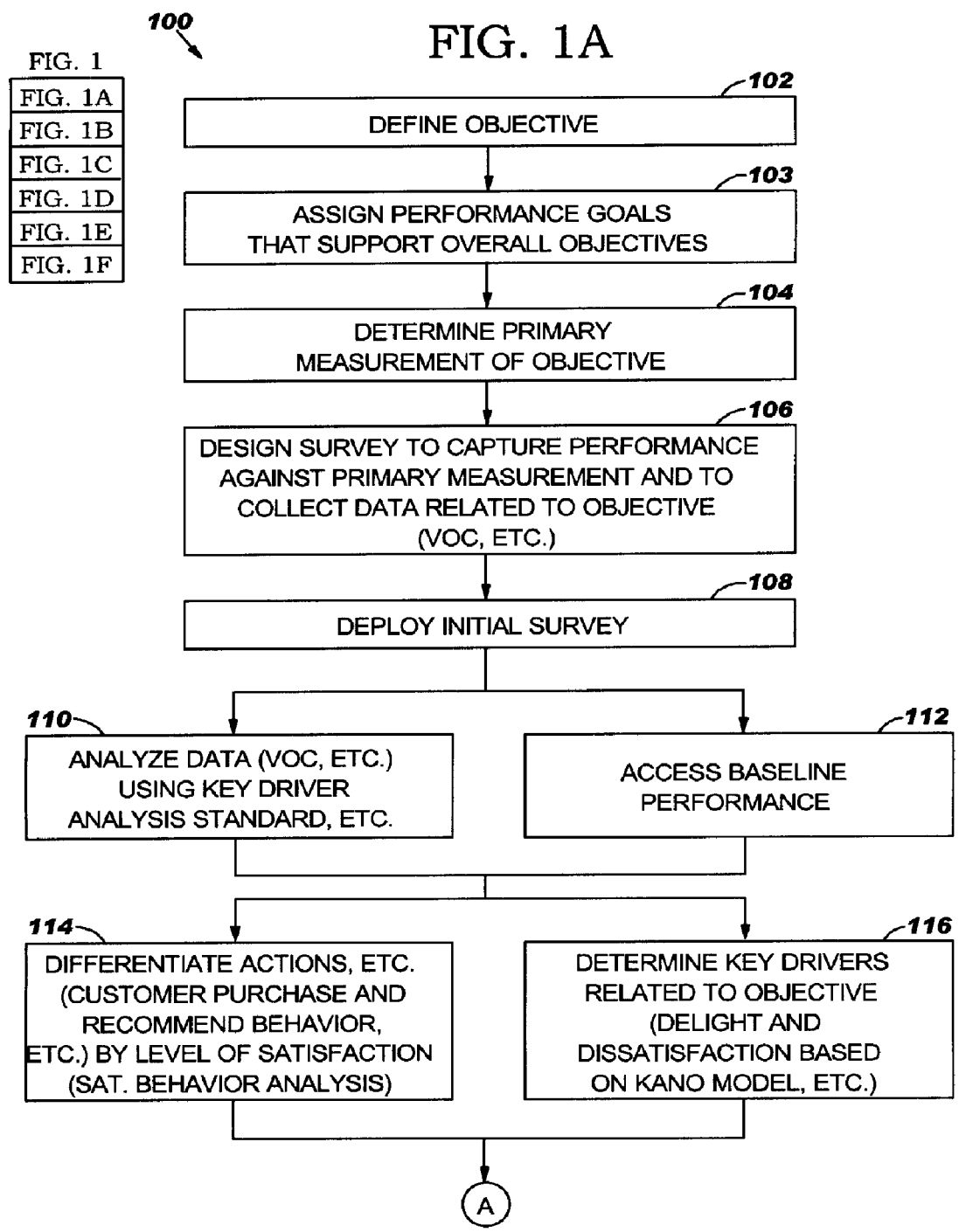

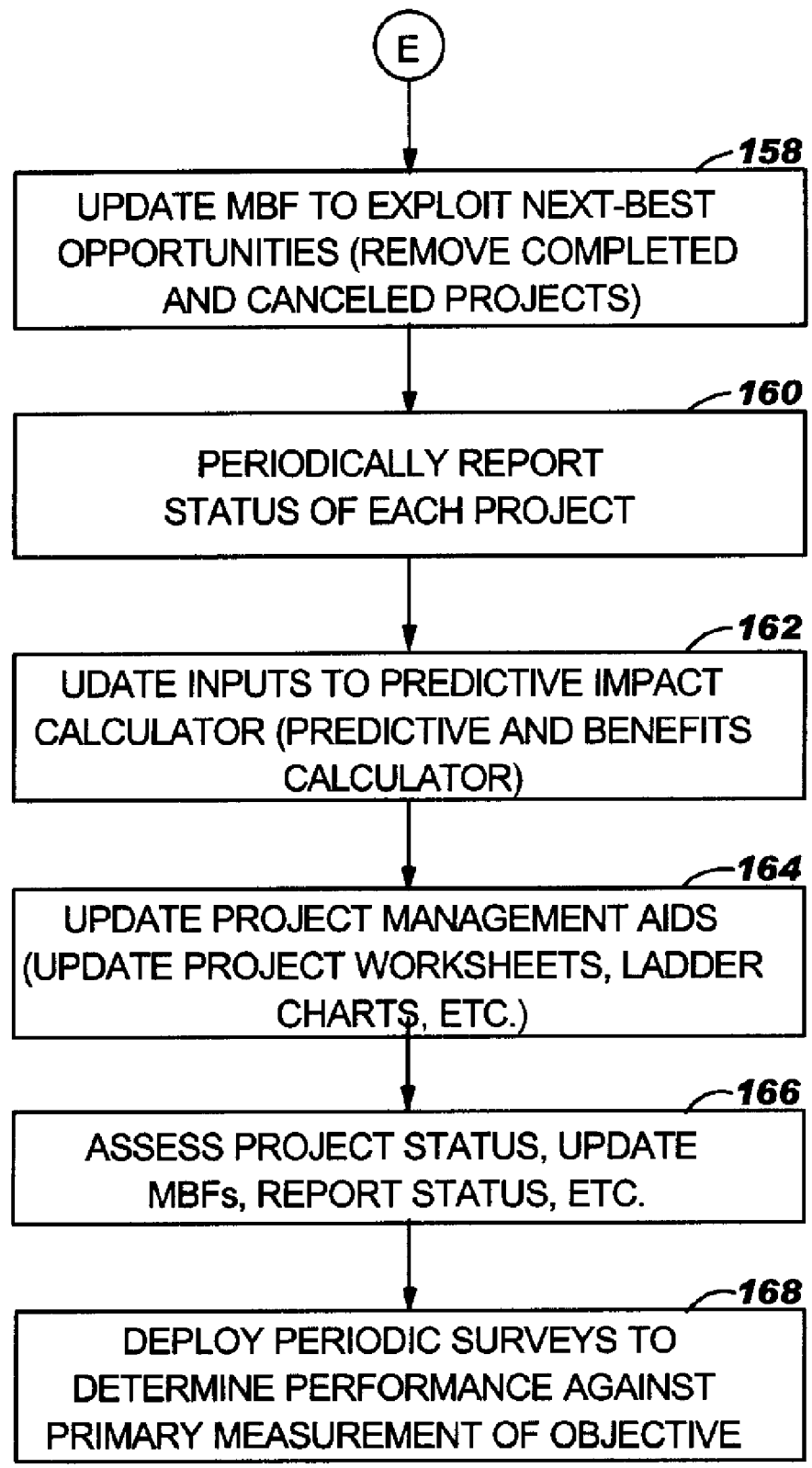

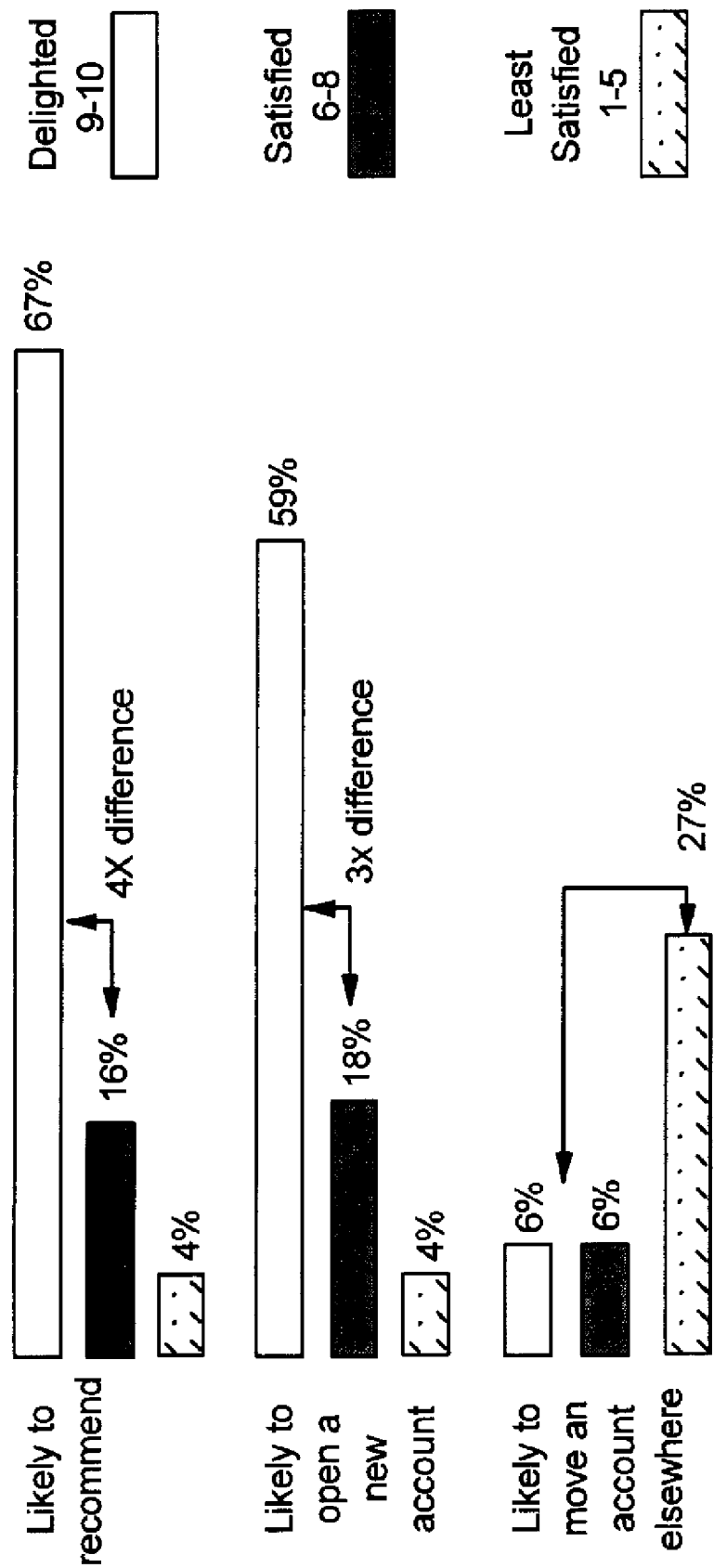

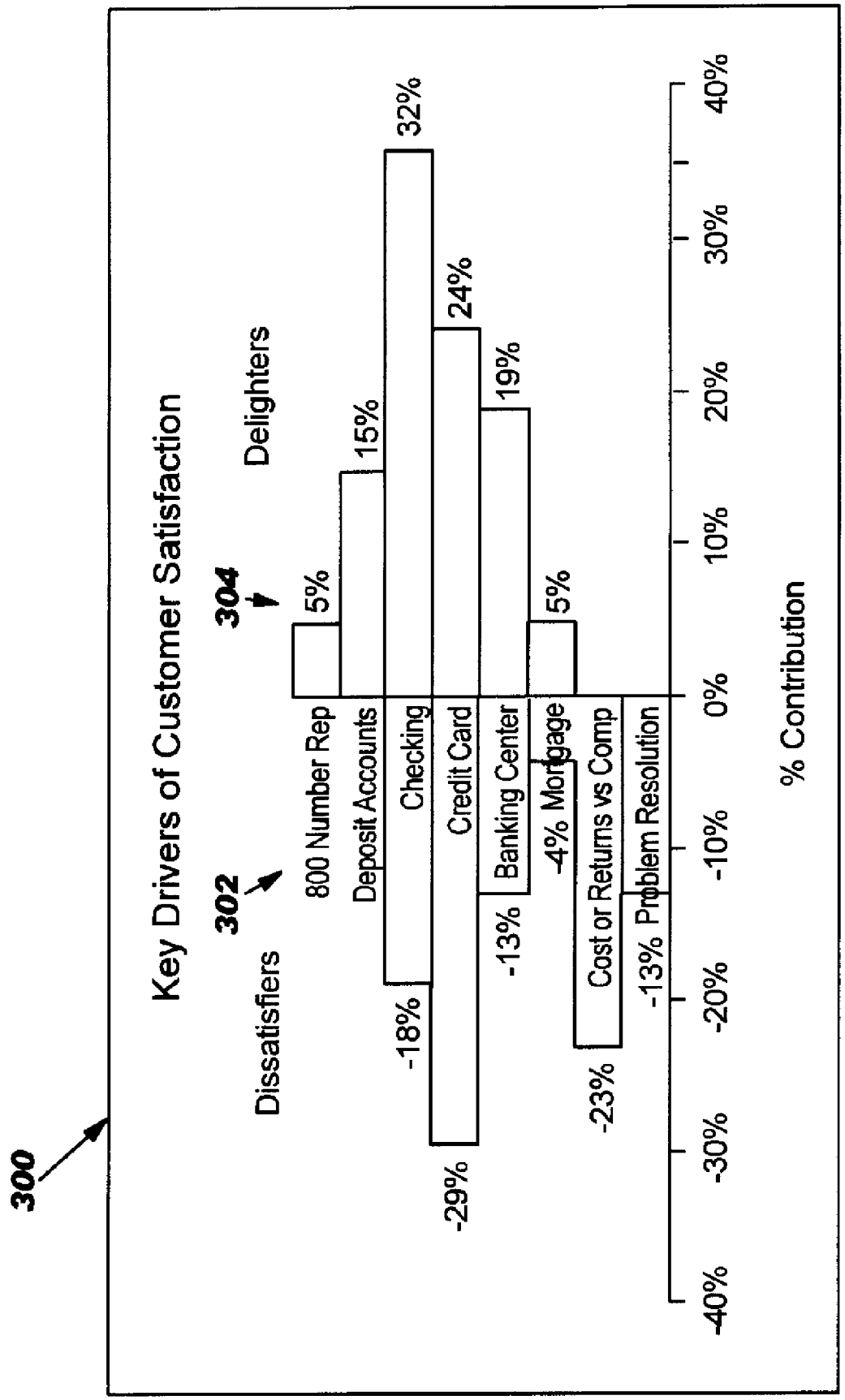

METHOD AND SYSTEM TO MANAGE ACHIEVING AN OBJECTIVE

BACKGROUND OF INVENTION

The present invention relates to managing objectives, such as business objectives or the like and more particularly to a method and system to manage achieving an objective, such as customer satisfaction, delight or the like.

In many industries, there is significant competition for customers. This includes attracting new customers and retaining current customers. This is particularly true in the banking industry as well as other service sector businesses where customer satisfaction or delight is important. A dissatisfied customer is highly unlikely to recommend the business or service to others and may even take his business to a competitor. Worse, a dissatisfied customer could spread "negative word-of-mouth" to other potential customers. Additionally, retained customers tend to be less expensive to service. Therefore, a customer who is delighted stays longer with a service provider, generates more income and costs less which will lead to increased net present value over time.

Many businesses pay little attention to customer satisfaction or delight, and if they do, predicting customer satisfaction is little more than guess work. The results are rarely based on sound analysis and targeted initiatives.

SUMMARY OF INVENTION

In accordance with an embodiment of the present invention, a method to manage achieving an objective may include collecting data related to the objective and determining a set of drivers related to the objective. The method may also include calculating a gap for each driver between a baseline and a goal for the objective and analyzing the gap to associate a quantity of gap points with each driver to achieve the goal.

In accordance with another embodiment of the present invention, a method to manage achieving an objective may include collecting data related to the objective and determining a set of key drivers related to the objective. The method may also include calculating a gap for each key driver between a baseline and a goal for the objective. The gap may be analyzed to associate a quantity of gap points with each key driver to achieve the goal. The method may further include determining a set of sub-level drivers related to each key driver and analyzing the gap for each key driver to associate a portion of the quantity of gap points contributable to each sub-level driver. Any improvements may be identified to close the portion of the quantity of gap points contributable to each sub-level driver and the method may also include implementing selected improvements.

In accordance with another embodiment of the present invention, a system to manage achieving an objective may include means for collecting data related to the objective and means for determining a set of drivers related to the objective. The system may also include a data structure to calculate a gap for each driver between a baseline and a goal for the objective. The system may further include a data structure to analyze the gap to associate a quantity of gap points with each driver to achieve the goal.

In accordance with a further embodiment of the present invention, a computer-readable medium having computer executable instructions for performing a method may include collecting data related to the objective and determining a set of drivers related to the objective. The method may also include calculating a gap for each driver between a baseline and a goal for the objective. The method may further include analyzing the gap to associate a quantity of gap points with each driver to achieve the goal.

DESCRIPTION OF THE DRAWINGS

FIGS. 1A-1F (collectively FIG. 1) is a flow chart of an example of a method to manage achieving an objective in accordance with an embodiment of the present invention.

FIG. 2 is an example of a Satisfaction Behavioral Analysis for customer satisfaction in accordance with an embodiment of the present invention.

FIG. 3 is an example of an illustration of a "butterfly" chart of key drivers of customer satisfaction for a banking or financial institution in accordance with an embodiment of the present invention.

DETAILED DESCRIPTION

Figure 1B:
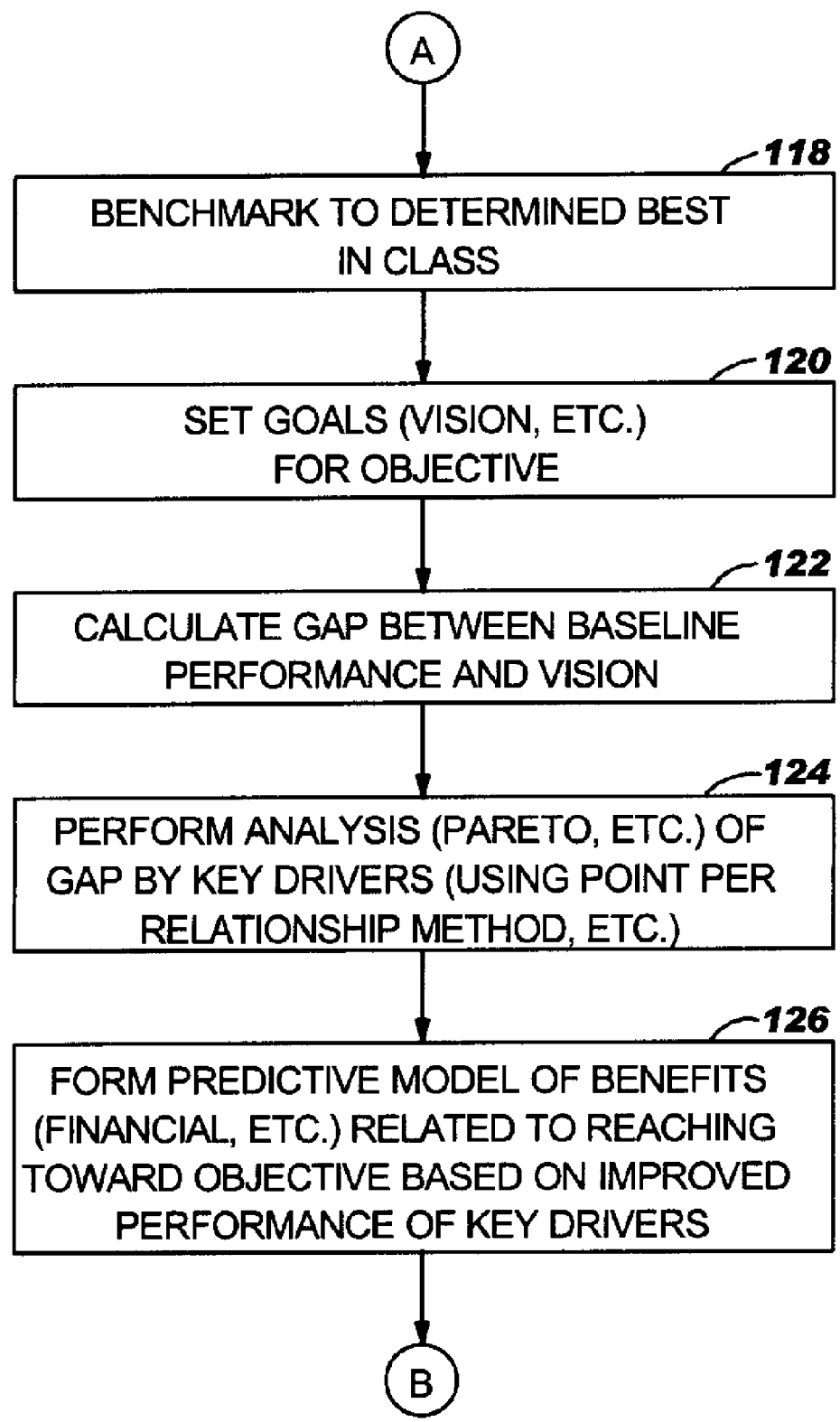
Figure 1C:
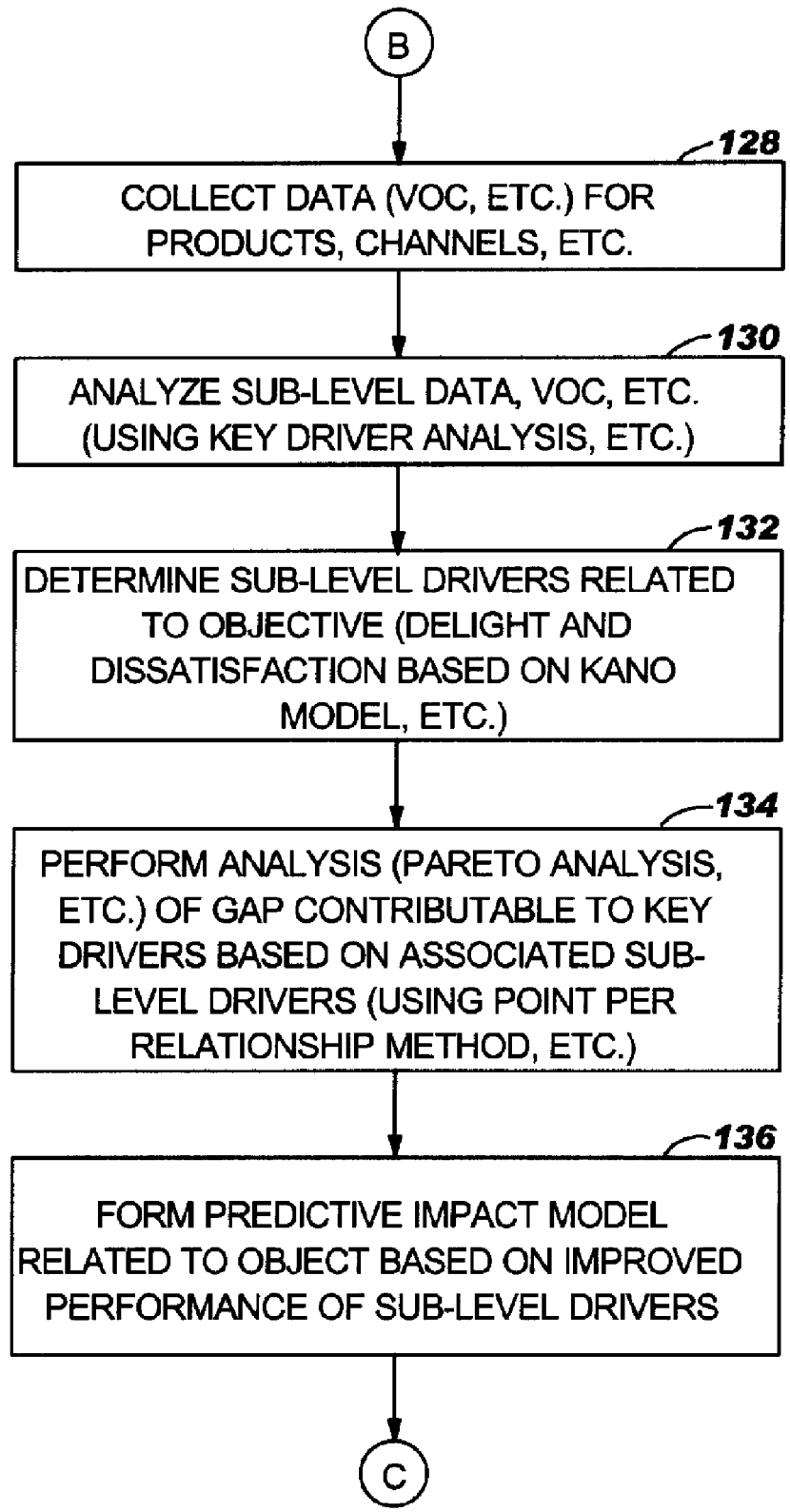
Figure 1D:
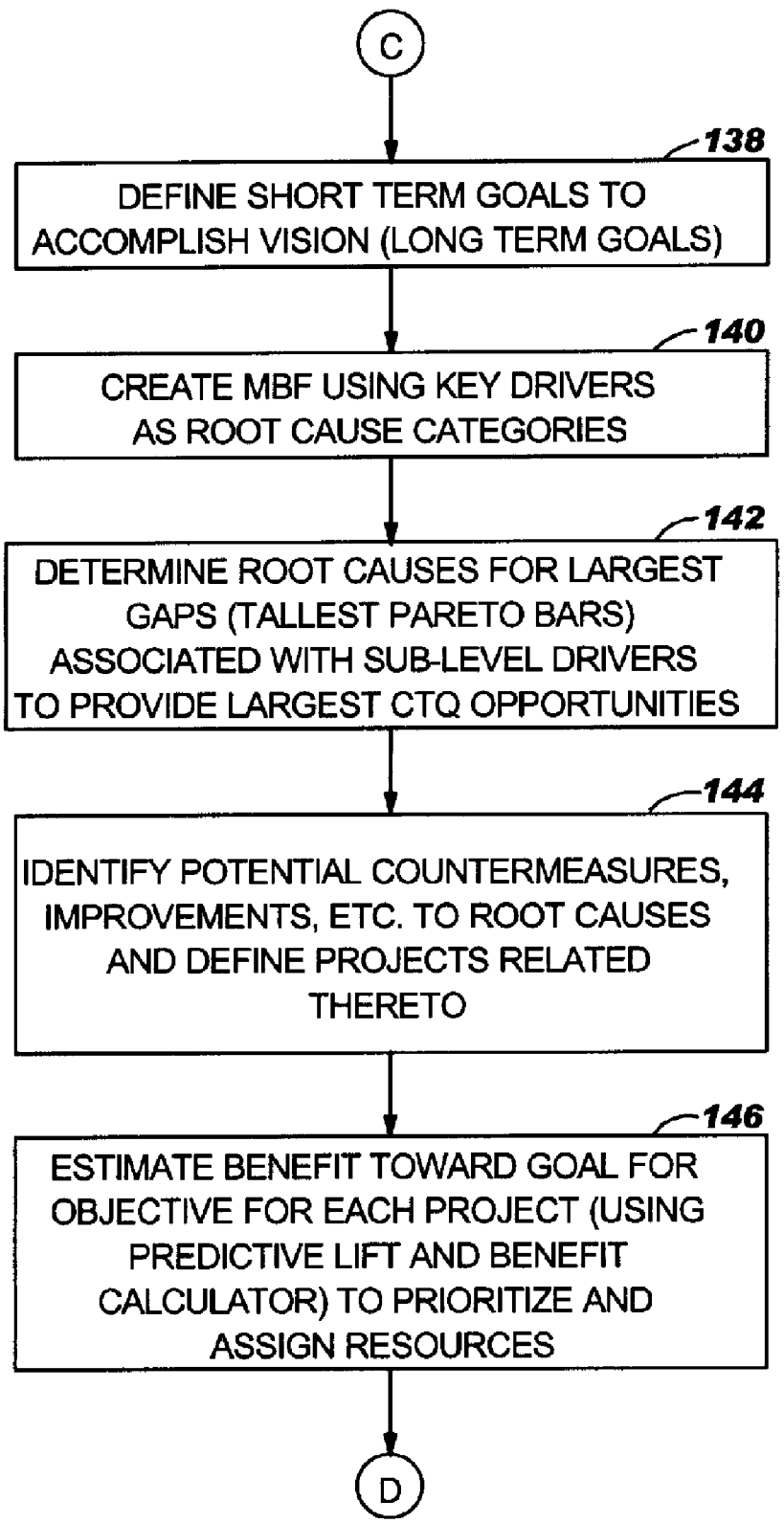
Figure 1E:
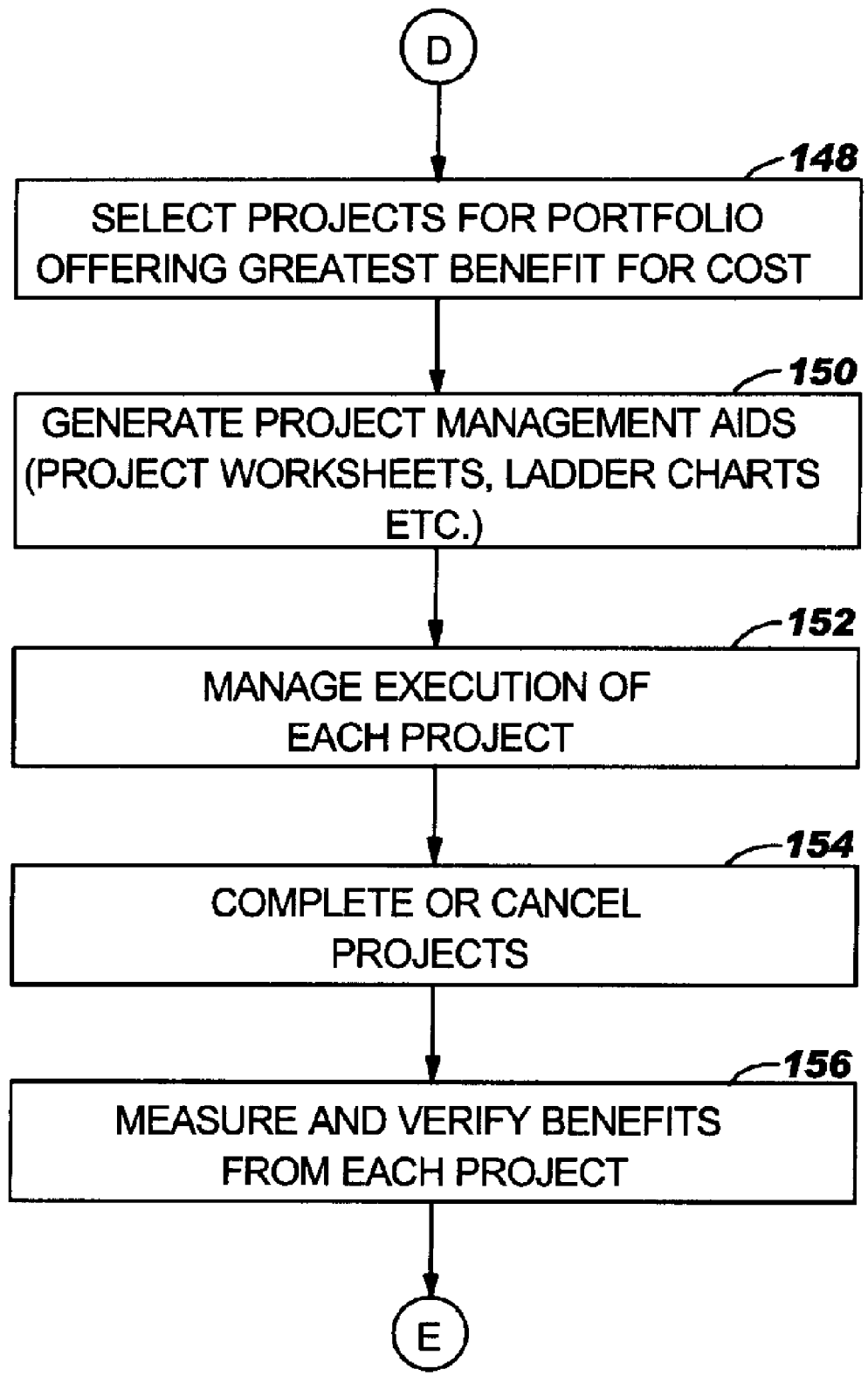

The following detailed description of preferred embodiments refers to the accompanying drawings, which illustrate specific embodiments of the invention. Other embodiments having different structures and operations do not depart from the scope of the present invention.

FIGS. 1A-1F (collectively FIG. 1) is a flow chart of an example of a method 100 to manage achieving an objective in accordance with an embodiment of the present invention. In block 102, an objective may be defined. As an example of the present invention, such an objective may be to manage, improve or increase customer delight or satisfaction. While the present invention may be described with respect to managing customer delight in a banking or financial institution environment, those skilled in the art will recognize that the principles and features of the present invention may also be applied or adapted for use in managing other objectives, such as business objectives or the like in other industries or environments. As a further example, principles and features of the present invention may be applied to manage satisfaction of employees or any type individuals that interface or interact with a business or other entity.

In block 103, performance goals that support the overall objective may be assigned to associate groups or individuals in accordance with an embodiment of the present invention. Compensation may be structured so that some portion of the associate's total compensation would depend upon success in reaching the performance goal. The assessment of performance to the goals may be made on a periodic basis, such as annually or more frequently.

In block 104, a primary measurement of the objective may be determined. As an example, the primary metric or measurement may be the percent of customers who are highly satisfied, or delighted with a particular entity, such as a bank, financial institution or other business entity. The measurement may be more specifically defined as the percentage of customers who rate satisfaction as a 9 or 10 on a scale of 1-10.

Other specific measurements and scales could be selected as well depending upon the particular circumstances. The determination of the metric or measurement may drive how customer data may be captured and which benchmarks, such as other business entities or companies that may be selected as benchmarks in method 100 as described below.

In block 106, a survey may be designed to capture performance against the primary measurement and to collect data related to the objective, such as collecting data to catalog the "voice of the customer" or similar data. Accordingly, the survey may be designed and deployed to determine how customers rate the bank or business and also capture the "voice of the customer" (VOC) or details about customer likes and dislikes, so that analysis can be performed to determine what the business can do to increase delight and decrease dissatisfaction. Additionally, the survey may provide data showing the relationship between satisfaction and customer behavior related to the customer giving more business to the entity or using the entity more (spending more money with the bank or business), referring the bank or business to others, and continuing the relationship with the bank or business rather than going to a competitor.

In block 108, the survey may be deployed. The survey should include enough customers and gather enough data to perform rigorous analyses so that the resulting model may have statistical significance and validity. The survey may be an initial survey and other surveys may be deployed at later times to obtain additional information or to evaluate how any initiatives or improvements implemented to increase customer delight or satisfaction may be working. While the present invention is described with respect to designing and deploying surveys and collecting and analyzing data there from, there may be other means of gathering data depending upon the objective defined in block 102, the particular business and other circumstances.

In block 110, the data gathered may be analyzed to create a model to determine the key drivers of delight and dissatisfaction or other drivers related to the objective or measurement of the objective. The data may be analyzed using a standard that may be established by the bank or business. A standard may be established to promote comparability across products and channels or lines of business so that research results from different areas or lines of business may be compared and contrasted where desirable. The standard may also maximize consistency between broad studies and different products or channels and loyalty studies or research so that general or specific findings may be integrated. Additionally, standard approaches to data gathering and analysis may insure that the bank or business's research reflects and incorporates state-of-the-art approaches and methodologies.

A standardize approach in gathering and analyzing data may include standardized scales for questions, wording of the questions, broad common attribute scales and the like. Other standardization features may include a common strategy in developing and phrasing attributes of the business in questions; question placement in a survey or questionnaire; use of first person/second person in question phrasing; level of specificity in questions, such as specificity related to products, services, channels or lines of business, or the like. Standardization may also include techniques and methodologies related to sampling customer populations; reporting results, such as bases for percentage tabulations or the like; driver analysis or causes for certain behavior or results; business recommendations; screening, such as taking into consideration common demographics; appending data and similar areas of consideration in standardizing data gathering and analysis.

In block 112, the bank or business's baseline performance or current performance against the primary measurement or metric may be determined and set as a baseline. The input to this operation or analysis may be the survey data and the analysis standard discussed above. The output may be regression models to explain the drivers of delight and dissatisfaction or other drivers related to the objective or measurement of the objective. While blocks 110 and 112 may be illustrated as possibly being done simultaneously in method 100, these actions or events may occur at different times and are not alternatives to one another.

In block 114, a customer's actions or the like may be differentiated by level of satisfaction from the survey data. For example, differences in customer propensity to purchase additional products or services, recommend products or services or close a relationship with the bank or business may be evaluated or predicted from the level of satisfaction from the survey data. The results of this analysis may be a Satisfaction Behavioral Analysis or the like showing customer purchase, recommend and attrite behavior by level of satisfaction. FIG. 2 is an example of a Satisfaction Behavioral Analysis 200 for customer satisfaction in accordance with an embodiment of the present invention. The survey may include questions to obtain potential customer behavior or propensity, such as "likely to recommend bank or business," "likely to open a new account," "likely to move account elsewhere" or similar questions. From the survey data, those customers that respond to questions in the 9-10 range or delighted range on a 10 points scale, 10 being extremely satisfied and 1 being not at all satisfied, are likely to recommend the bank or business in FIG. 2. Those customers that respond to questions in the 6-8 or satisfied range are likely to open a new account. Those customers that respond to questions in the 1-5 range or least satisfied range are likely to move elsewhere.

In block 116, key drivers related to the objective may be determined. In the example, regression models from block 110 may be used to determine the key drivers of delight and dissatisfaction. The key drivers may be determined on the basis of a Kano Model or the like. The Kano Model or Kano Analysis is described in *The Six Sigma Way Team Fieldbook*, by Peter S. Pande, Robert P. Neuman and Roland R. Cavanagh (McGraw-Hill 2002). The Kano Model of customer or consumer satisfaction classifies product attributes based on how they are perceived by customers and their effect on customer satisfaction. These classifications are useful for guiding design decisions in that they indicate when good is good enough, and when more is better. The Kano Model is useful in identifying customer needs; determining functional requirements; concept development; and analyzing competitive products. The Kano Model divides product or service attributes into three categories: threshold, performance, and excitement. A competitive product meets basic attributes, maximizes performance attributes, and includes as many "excitement" attributes as possible at a cost the market can bear. The threshold category or basic attributes are required attributes. The performance attributes involve more is better, such as faster teller service, less time waiting for services, etc. The excitement attributes involve delighting the customer, such as providing a Global Positioning System in a rental car, reclining seats on an airliner, etc. Features in each of these categories can change over time. For example, a remote control for a television set was a delighter when first introduced but now is a threshold attribute.

While blocks 114 and 116 are shown in method 100 as possibly being performed simultaneously, the actions or events depicted may be conducted at different times and are not alternatives to one another.

FIG. 3 is an example of an illustration of a "butterfly" chart 300 of key drivers of customer satisfaction for a banking or financial institution based on a Kano Analysis in accordance with an embodiment of the present invention. The chart 300 shows dissatisfiers 302 or a percentage of dissatisfied customers for each key driver on the left side of the chart and delighters 304 or a percentage of delighted customers for each key driver on the right side of the chart. Examples of key drivers in a banking or financial institution environment may include 800 number representative or customer service; deposit accounts; checking; credit card; banking center; mortgage; cost or returns versus comp; and problem resolution. For the key driver checking, from chart 300, 18% of the customers surveyed responded to questions related to checking as being dissatisfied based on the Kano analysis, and 32% of the customers surveyed responded to questions related to checking as being delighted based on the Kano analysis.

Returning to FIG. 1B, in block 118, benchmarking may be performed to determine best in class in accordance with one embodiment of the present invention. Companies that have excellent reputations for customer satisfaction in their industries may be ideal candidates to use for benchmarking purposes. The benchmark provides a world-class standard by which to compare performance.

In block 120, a goal or goals for achieving the objective may be set. For example, a vision or goal for customer delight may be set or determined. The vision or goal may be to reach the benchmark or world-class performance. Reaching world-class performance can become the long-term goal for the business. The goal or vision may be stated and guide future decision-making. Result of this operation may be a vision statement.

In block 122, a gap may be calculated between a baseline performance and the vision or goal. Determining the gap may involve determining a difference between the baseline determined in block 122 and the goal or goals set in block 120.

In block 124, an analysis of the gap by key drivers may be performed. The analysis may include a Pareto analysis or the like and may use a point per relationship method or similar method to represent the population of interest, such as customers, employees or the like depending upon the circumstances. The Pareto analysis involves breaking down the gap by key drivers. This can be done mathematically using the point per relationship method. For example, the results of the analysis may show which drivers of delight and dissatisfaction based on relationships or population are needed to be moved either out of dissatisfaction or into delight to reach the goal or vision. The resulting Pareto chart provides guidance as to which drivers may be addressed first in an environment of constrained project management resources. Pareto analysis and Pareto Charts are described in *The Six Sigma Way Team Fieldbook*, by Peter S. Pande, Robert P. Neuman and Roland R. Cavanagh (McGraw-Hill 2002).

As an example of managing an improvement in customer satisfaction or delight, an assumption may be made that a bank or financial institution's vision or goal is for 90% of its customers to rate satisfaction with the bank as 9 or 10 from the survey data discussed above. This would be in the delighted range as previously described. As a baseline, assume that 40.6% of customers responding to the survey scored the bank as a 9 or 10. 46.4% scored the bank in the 6-8 range and 13.0% of customers scored the bank 1-5. Further, assume that world class benchmark is considered to be 90% (9 or 10), 10% (6-8), and 0% (1-5). This may be the vision or goal for the bank. To achieve the goal or vision, the bank must move all of the people from dissatisfied (1-5) to satisfied (6-8) and move enough people from satisfied to delighted (9-10) to fill the gap from 40.6% to 90%, which is 49.4% of the total population. Since the starting point is only 40.6% of the population in the satisfied (6-8) range, it is clear that some of the relationships currently dissatisfied (1-5) will have to be moved through satisfied and into delight.

A relationship with a customer may be defined as the unit of focus. Accordingly, improving customer delight may be valued at that level. The goal is to increase the percentage of relationships in the top 2 survey boxes (9 and 10). Each relationship contributes some amount to that percentage. For ease of manipulation, the percent may be converted to an indexed score by multiplying the percent by 100, that is, 100 percent may be transformed into 100 points. Each relationship can therefore contribute a certain amount to that index. That amount is 100 divided by the total number of relationships. If there are approximately 27.7 million relationships with customers, each relationship may contribute approximately 100/27.7 million=0.0000036 point to the top 2 box score (9 and 10). In other words, if every customer were delighted with the bank, each customer would contribute 0.0000036 point and the total score would be 27.7 million× 0.0000036=100, which would correspond to 100 percent delight.

This concept is the basis of the Point per Relationship model. The gap between the vision and the current top 2 box percentage (90%−40.6%=49.4%) can be expressed as 49.4 points. Using this concept, specific initiatives, improvement projects or the like can be analyzed to determine the predictive impact any such initiative or improvement project would preferably have on the customer delight score.

The level of satisfaction that customers have with the bank may be determined from results of a quarterly survey of customers chosen at random. These customers may represent many combinations of product and channel use and have widely varying demographic and financial characteristics. The survey may consists of a battery of questions that seek to determine attitudes and behaviors of customers and their happiness (or unhappiness) with various product features and means of delivery as well as the frequency of problem incidence, problem resolution, and satisfaction of handling the problem.

Using data from the surveys, statistical analyses may be performed to determine and quantify on a relative basis the key drivers of delight and dissatisfaction, based on the Kano Model, similar to that described above. The statistically significant factors that contribute to delight and dissatisfaction may be as indicated below in Table 1 and shown in FIG. 3.

TABLE 1

| DELIGHT | | DISSATISFACTION | |
|---|---|---|---|
| Checking | 32% | Credit Card | 29% |
| Credit Card | 24% | Cost or Returns vs Competition | 23% |
| Banking Center | 19% | Checking | 18% |
| Deposit Accounts | 15% | Banking Center | 13% |
| 800 Number Rep. | 5% | Problem Resolution | 13% |
| Mortgage | 5% | Mortgage | 4% |
| | 100% | | 100% |

The percentages associated with each key driver provide a basis of comparison as to the impact each may have on delight or dissatisfaction. Some key drivers may also drive both delight and dissatisfaction and others may drive only one or the other. Since any initiative or improvement project would be targeted to customers in general, rather than specifically toward a person who is dissatisfied. For example, the drivers may be normalized to apply to all customers. After all, it is impossible to tell whether the next person in line at a teller would score the bank in the top 2, middle 3, or bottom 5 satisfaction ranges. Therefore, the drivers may be quantified on a single scale, summing to 100%, to allow initiatives to be assessed based on how well they would be expected to increase satisfaction and correspondingly decrease dissatisfaction. This may be shown using a Pareto analysis as previously discussed.

For example, take checking. From the table above or FIG. 3, checking is a 32% driver of delight and an 18% driver of dissatisfaction. 32% times 13.7 million is about 4 million and 18% of 3.2 million is about 0.6 million. Added together, checking is "responsible" for moving 4.6 million relationships. 4.6 million divided by 15.8 million is about 29%, which becomes the percentage associated with the checking key driver. Points of gap are then determined by multiplying these percentages by the total points of gap to delight, or 45.4. All of the key drivers, related percentages, and assigned points of gap or quantity of gap points (column k) are given below:

TABLE 2

| | Delighters | | | Dissatisfiers | | | Combined | | |
|---|---|---|---|---|---|---|---|---|---|
| a | b | c<br>Rel's to<br>Delight<br>(multiply<br>b × c) | d | e | f<br>Rel's to<br>Satisfy<br>(multiply<br>e × f) | g | h<br>Rel's to<br>move<br>(add<br>c + f) | j<br>(divide h by<br>total h) | Gap<br>k<br>(multiply<br>49.4 by j) |
| Total | | 13669491 | Total | | 3597234 | Total | 17266725 | | 49.4 |
| Checking | 32% | 4374237 | Checking | 18% | 647502 | Checking | 5021739 | 29% | 14.4 |
| Credit Card | 24% | 3280678 | Credit Card | 29% | 1043198 | Credit Card | 4323876 | 25% | 12.4 |
| Banking Center | 19% | 2597203 | Banking Center | 13% | 467640 | Banking Center | 3064844 | 18% | 8.8 |
| Deposit Accounts | 15% | 2050424 | | | | Deposit Accounts | 2050424 | 12% | 5.9 |
| Mortgage | 5% | 683475 | Mortgage | 4% | 143889 | Mortgage | 827364 | 5% | 2.4 |
| | | | Cost or Returns vs Comp | 23% | 827364 | Cost or Returns vs Comp | 827364 | 5% | 2.4 |
| 800 Number Rep | 5% | 683475 | | | | 800 Number Rep | 683475 | 4% | 2.0 |
| | | | Problem Resolution | 13% | 467640 | Problem Resolution | 467640 | 3% | 1.3 |

To perform a Pareto analysis, drivers of delight may be weighted based on the number of relationships that would have to be "moved" from satisfied to delight. This is calculated as the gap to vision times the population, or 49.4%×27.7 million, which is approximately 13.7 million. Then, this population is multiplied by each of the percentages associated with drivers of delight. Each driver of delight then has a population "associated" with it.

Similarly, drivers of dissatisfaction are weighted based on the number of relationships that would have to be moved from dissatisfied to satisfied. This is calculated as the percent bottom 5 box percent times the population, since the vision for bottom 5 box is 0. 13% times 27.7 million is approximately 3.6 million. This population is multiplied by each of the percentages associated with drivers of dissatisfaction. Each driver of dissatisfaction then has a population associated with it.

The total number of relationships to be moved from dissatisfied to satisfied is added to the number of relationships to be moved from satisfied to delighted. This is the total number of relationships that have to be moved, approximately 15.8 million, and is the basis for ranking. For those drivers that drive both dissatisfied and delighted, the two populations associated with the driver are added. For those that drive one or the other, the populations associated are left alone. For each driver, the total population that is associated with it from these calculations is divided by the total number of relationships to be moved, resulting in a new percentage attributed to each driver. This is the percentage used to determine the impact an initiative would have on satisfaction.

Figure 4:
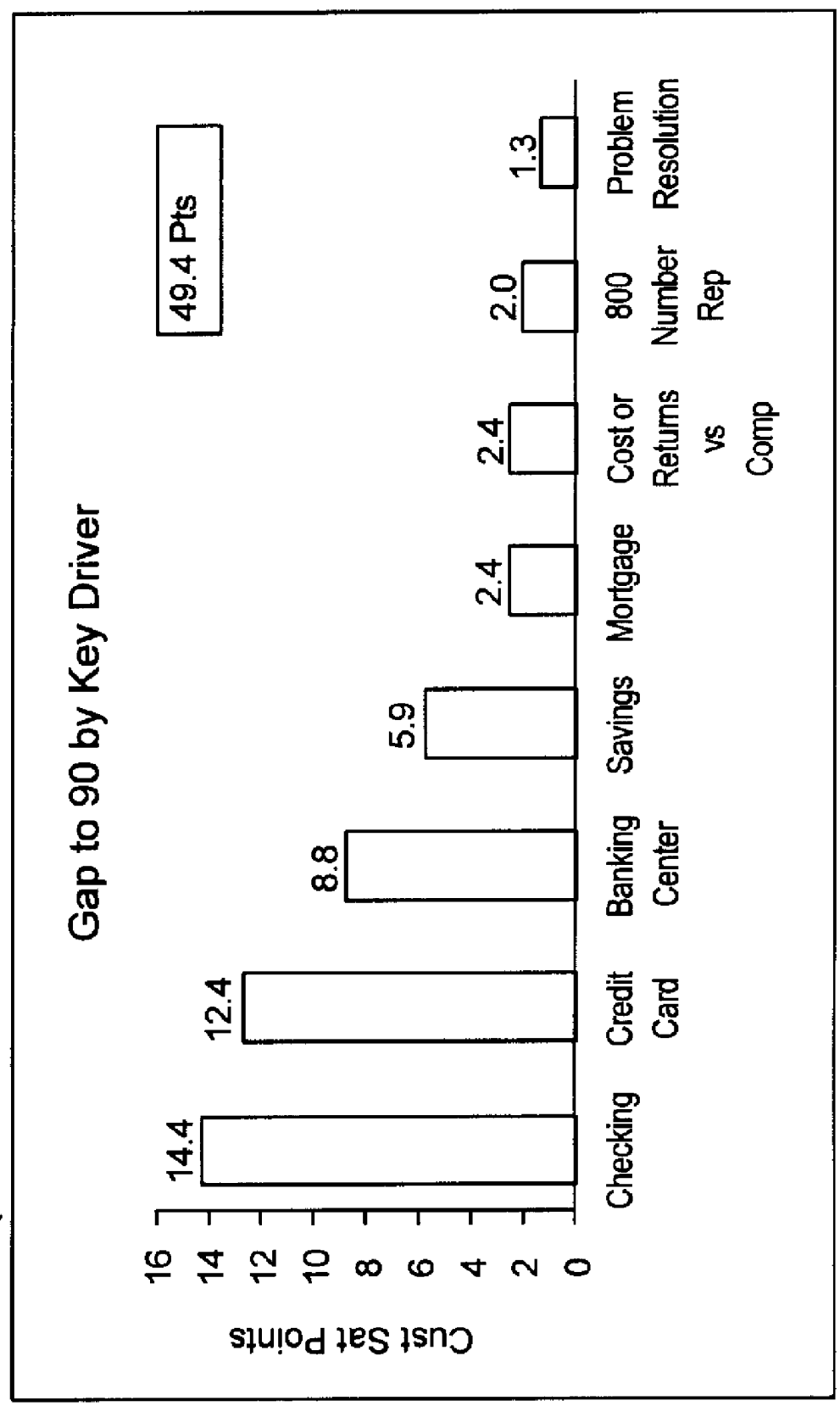
FIG. 4 is an example of a Pareto chart from Pareto analysis of key drivers of customer satisfaction for a banking or financial institution in accordance with an embodiment of the present invention.

FIG. 4 is an example of a Pareto chart 400 of the key drivers of customer satisfaction for a banking or financial institution from the Pareto analysis and Table 2 above in accordance with an embodiment of the present invention. Note that the heights of the bars come from the far right column in the table. In the example, the points of gap or quantity of gap points for checking is 14.4. The quantity of gap points for the credit card key driver is 12.4 and so forth for the other key driver in FIG. 4.

Returning to FIG. 1B, in block 126, a predictive model of the benefits, such as financial benefits or the like, related to reaching toward the objective may be formed based on improved performance of key drivers. Assumptions around predicted customer behavior and associated value due to changes in satisfaction based on the Satisfaction Behavioral Analysis in block 114 may be created. Inputs to this process may be the Satisfaction Behavioral Analysis in block 114 and assumed values of customers purchasing additional products or services, customers recommending the bank and customer continuing to do business with the bank.

As an example of forming a predictive benefit model, three (3) financial metrics, (1) revenue, (2) pre-tax income, and (3) shareholder value added (SVA) may be calculated for (a) moving customers from satisfied to delighted and (b) moving customers from dissatisfied to satisfied. The valuation for moving customers from satisfied to delighted may consists of 2 subsets: (1) the financial impact of moving customers into the "likely to recommend" category and (2) the financial impact of moving customers into the "likely to purchase another bank product" category, which may also referred to as the "buying window".

The valuation of moving customers from dissatisfied to satisfied may consists of 3 subsets: (1) the financial impact of moving customers into the "likely to recommend" category, (2) financial impact of moving customers into the "likely to purchase another bank product" category, and (3) financial impact of saving customer relationships that may otherwise attrite.

Within each of these valuation subsets, there is a range of analysis ("low", "medium" and "high") offering end users flexibility in levels of conservatism that is structured around the following criteria:

"Likely to Recommend"
  Low—2% of the customers moved into the "likely to recommend" category tells one positive story that leads to a new relationship (2% response rate).
  Medium—4% of the customers moved into the "likely to recommend" category tell one positive story that leads to a new relationship (4% response rate).
  High—6% of the customers moved into the "likely to recommend" category tells one positive story that leads to a new relationship (6% response rate).
"Likely to Purchase Another Bank Product"
  Low—50% of customers moved into the "buying window" actually buy another bank product (50% purchase rate).
  Medium—75% of customers moved into the "buying window" actually buy Another bank product (75% purchase rate).
  High—100% of customers moved into the "buying window" actually buy another bank product (100% purchase rate).
"Likely to Attrite"
  For attrition, only movements from Dissatisfied achieve value and it is at the average value of a relationship. As such, Low, Medium and High are all calculated as the same dollar value.

Underlying each dollar value are the following calculations:

"Likely to Recommend"

> # of relationships impacted×Annualized $ Value per Account for New Relationships×Applicable Response Rate "Likely to Purchase Another Bank Product"

> # of relationships impacted×Annualized $ Value per Account for Cross selling existing relationships× Applicable Response Rate "Likely to Attrite"
For Movement from Dissatisfied to Satisfied only.

> # of relationships impacted×Annualized $ Value per Account per Relationship

The dollar ($) value per Account can be one of three potential financial values, referred to earlier (Revenue, Pre-tax Net Income or SVA). For "Likely to Attrite" the annualized value per account is the weighted average value of all customer segment groups.

For "Likely to Recommend" and "Likely to Purchase Another Bank Product", the average value per relationship is the sum of the value per relationship of each bank product times the percentage allocated as the next likely product opening of the existing customer in the case of "likely to purchase" or new relationship in the case of "likely to recommend".

Returning to method 100 in FIG. 1, knowing the relative contributions of the key drivers is a good start, but this may be too broad to calculate the impact of a given initiative or improvement project. For example, checking is a key driver in FIGS. 3 and 4, but on which characteristics of checking products should focus be placed. To determine this, statistical analyses may be performed on survey results related to each key driver to determine the significant sub-drivers. In block 128 (FIG. 1C), data, such as VOC data or the like, may be collected for different products, services, channels, lines of business or the like. Proprietary research may be commissioned to collect the VOC data. The key drivers determined in block 116 may provide an indication where to focus attention. Further detailed information may be needed to determine specific actions to take. Key driver lines of business may conduct further surveying to collect data needed to perform additional analysis.

In block 130, sub-level data, such as VOC or other data, may be analyzed using the key driver analysis similar to block 110. As was done in block 110 with product and channel data, next-level or sub-level VOC data or the like may be analyzed to determine critical to quality (CTQ) characteristics for customers of the products and channels that were determined to be the key drivers of satisfaction. Regression models similar to those formed in block 110 may be created or formed so that second-level or sub-level drivers may be determined.

Figure 5:
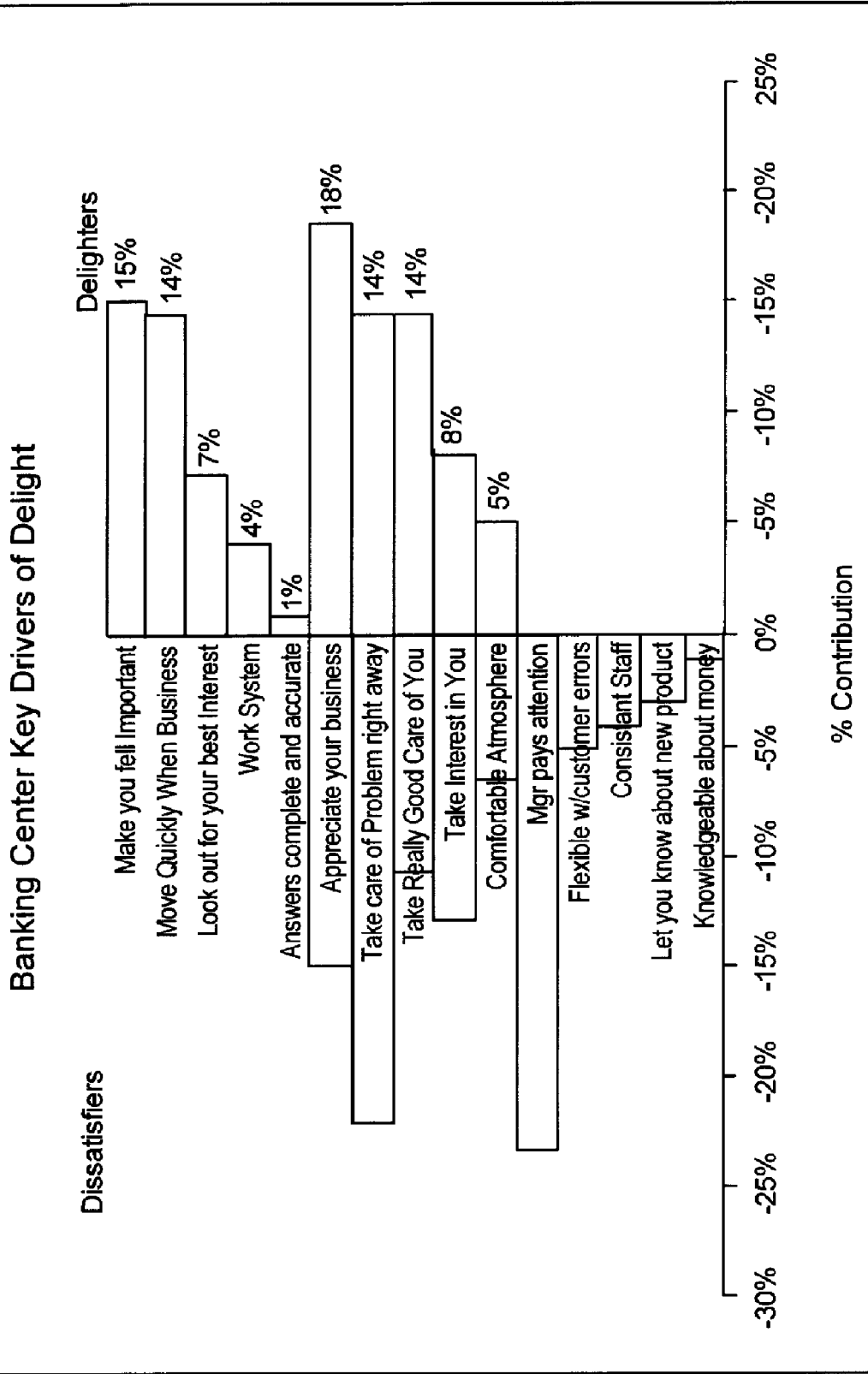
FIG. 5 is an example of an illustration of sub-level drivers for a key driver of customer satisfaction for a banking or financial institution in accordance with an embodiment of the present invention.

In block 132, sub-level drivers for each key driver related to the objective (improving customer satisfaction or delight, etc.) may be determined. The sub-level drivers may be determined based on a Kano Model or the like similar to that described with respect to the key drivers in block 116. FIG. 5 is an example of a butterfly chart 500 of sub-level drivers for a key driver of customer satisfaction for a banking or financial institution in accordance with an embodiment of the present invention. The example shown in FIG. 5 depicts the sub-level drivers or second-level drivers for the banking center key driver. Other key drivers determined by Kano analysis in block 116 and depicted in the chart 300 of FIG. 3 may also have sub-level drivers that may be analyzed using the Kano model and represented in a butterfly chart similar to chart 500 for the Banking Center. The sub-level drivers for each key driver may also be quantified relative to each other, using the same methodology as the key drivers—by weighting the results of the Kano analyses by population to be moved.

In block 134, analysis of the gap contributable to key drivers based on the associated sub-level drivers may be performed. The analysis may be Pareto analysis or the like using the point per relationship method or like method, similar to that described with respect to the Pareto analysis in block 124. Using checking as an example, sub-drivers of delight and dissatisfaction for checking may be determined. From the analysis of key drivers, checking is "responsible" for moving about 4.4 million relationships from satisfied to delight and about 0.6 million from dissatisfied to satisfied. One of the sub-drivers is "Balance/Overdraft Protection", which drives delight by 6% and dissatisfaction by 6%. Thus, Balance/Overdraft Protection is "responsible" for moving 6% of the 4.4 million, or about 262,000 customers to delight and about 6% of the 0.6 million, or about 39,000 customers to satisfied. The total for Balance/Overdraft Protection, 301,000 is divided by the total assigned to checking, 5.0 million, to get a combined weight of 301,000/5,000,000, or 6%. Each key driver has a number of sub-drivers whose associated percentages sum to 100%. The sub-drivers and associated percentages are given below for the top three key drivers (Checking, Credit Card, and Banking Center).

TABLE 3

| Driver/Subdriver | Weight | Gap Points |
|---|---|---|
| Checking | 29% | 14.4 |
| Low Min Bal to Avoid Fee | 14% | 2.0 |
| Wants to Keep Business | 11% | 1.6 |
| Assoc Courteous to Customer | 8% | 1.1 |
| Anticipates/Answers Questions | 6% | 0.9 |
| Balance Overdraft/Protection | 6% | 0.9 |
| Enough Tellers at BC | 5% | 0.8 |
| ATM Easy to Use | 4% | 0.6 |
| Same Day Credit on Deposits | 4% | 0.6 |
| Provides Services beyond Ckg | 4% | 0.5 |
| Has Discounts on other Prods | 4% | 0.5 |
| Tel Bank Fewer Total Menus | 3% | 0.5 |
| Tel Bank Has Reasonable Fees | 3% | 0.5 |
| No Transaction Fee OON ATM | 3% | 0.5 |
| 24/7/365 Access to Staff | 3% | 0.4 |
| 100% Accuracy on Transactions | 3% | 0.4 |
| Have Name/Phone No of Assoc | 2% | 0.3 |
| Detailed Explanation to Question | 2% | 0.2 |
| CSR Believes your Assess of Prob | 1% | 0.2 |
| Communicate Helpful Info | 1% | 0.2 |
| Doesn't Need Supv Approval | 1% | 0.1 |
| Resolve Problem Correctly | 1% | 0.1 |
| CSR Treats Customer w/Respect | 1% | 0.1 |
| Proactive Notification of Probs | 1% | 0.1 |
| Ability to Pay Bills Online | 1% | 0.1 |
| Other | 7% | 1.1 |
| Credit Card | 25% | 12.4 |
| Customer Appreciation | 35% | 4.3 |
| Interest Rate on Bal Transfers | 20% | 2.5 |
| Type of Card | 20% | 2.5 |
| Interest Rate on Purchases | 13% | 1.6 |
| Statement Reg Arrives on Time | 12% | 1.5 |
| Banking Center | 18% | 8.8 |
| Appreciate your business | 17% | 1.5 |
| Take care of Problem right away | 15% | 1.3 |
| Take Really Good Care of You | 13% | 1.2 |
| Make you feel Important | 13% | 1.1 |
| Move Quickly When Busy | 12% | 1.0 |
| Take Interest in You | 9% | 0.8 |
| Look out for your best interest | 6% | 0.5 |
| Comfortable Atmosphere | 5% | 0.5 |
| Work System | 3% | 0.3 |
| Mgr pays attention | 4% | 0.3 |
| Answers complete and accurate | 1% | 0.1 |
| Flexible w/customer errors | 1% | 0.1 |
| Consistent Staff | 1% | 0.1 |
| Let you know about new product | 0% | 0.0 |
| Knowledgeable about money | 0% | 0.0 |

Figure 6:
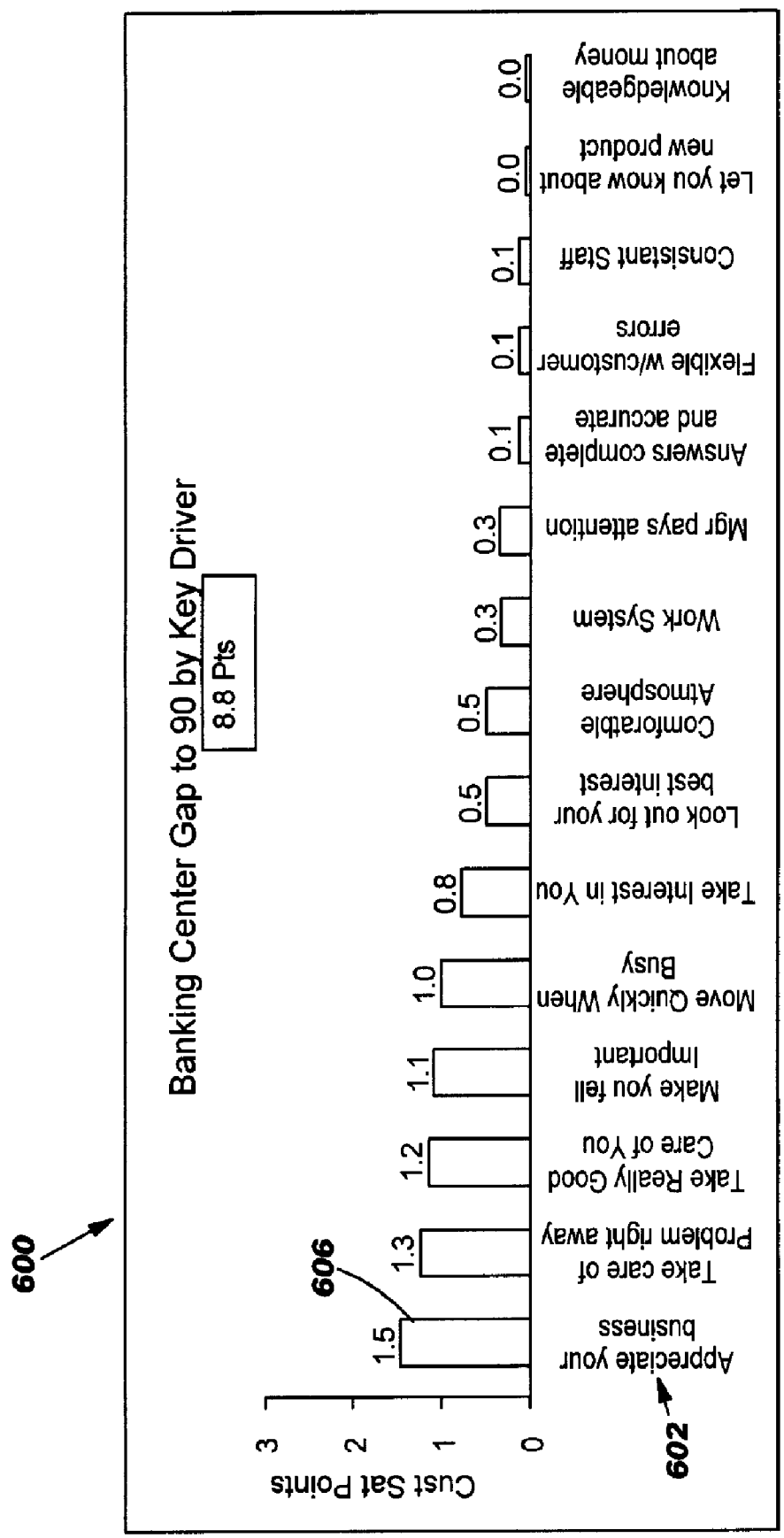
FIG. 6 is an example of a Pareto chart from Pareto analysis of the sub-level drivers of FIG. 5.

FIG. 6 is an example of a Pareto chart 600 from Pareto analysis of the sub-level drivers of FIG. 5. As previously described, the Pareto analysis may be similar to that described with respect to block 124 for the key drivers. The sub-drivers 602 may be listed on the horizontal axis and the number of customer satisfaction points 604 that may be attributable to each sub-level driver 602 may be indicated in the vertical axis of the chart 600. Note that the heights of the bars 606 decrease from left to right with the sub-level drivers having the greater impact to customer satisfaction being on the left. The points of gap or quantity of gap points for each sub-level driver may be represented by the height of the bar in the Pareto chart 600 associated with the sub-level driver. For example. For the sub-level driver "Appreciate your business" being expressed by a banking center employee to the customer represents 1.5 points of gap or quantity of gap points.

In block 136, a predictive impact model related to the objective based on improved performance of the sub-level drivers may be formed or determined. Using the point per relationship method previously described, the predictive model may be formed or updated to estimate an increase in customer satisfaction as a result of improving performance against sub-level drivers of customer delight and dissatisfaction. Using the weights or gap points calculated for the sub-level drivers in block 134, percentage of customers impacted, and estimated effectiveness, the model can calculate a predicted change in customer delight based on which sub-level drivers are addressed by an initiative or improvement project. The financial benefits can then be estimated based on predicted changes in levels of customer satisfaction, based on the Satisfaction Behavioral Analysis and relationship and account value assumptions.

The above analysis allows attention to be focused on the items that would provide the greatest opportunity to lift delight. From the Table 3, it is clear that Checking Customer Service (4.9 gap points), Attention Received from Tellers in the Banking Center (4.4 gap points), Explanation of Checking Features (4.2 gap points), Keeping Checking Customers Informed (gap 3.6 points), and Banking Center Teller Wait Time (3.0 gap points) offer the greatest potential for improvement. Therefore, projects may be initiated to improve these. Lift in satisfaction from these projects can be predicted using the point per relationship methodology previously discussed.

The predictive impact of a project on customer satisfaction is the number of households it affects times the point per relationship times effectiveness of the project times the percent associated with the key driver it impacts times the sum of the percents associated with the sub-level drivers impacted. Also, the result may be discounted by multiplying it by the gap to delight. This is because it can only affect those that are not currently delighted. If a customer already ranks the bank as a 9 or 10, that customer cannot be moved higher.

As an example, take a project that is designed to impact Checking customers, and would affect customer service and explanation of features. Assuming that the project will be 50% effective and assuming about two-thirds of a bank's customers use checking products regularly. The lift that the project may be projected to provide may be calculated as follows:

$$Lift = HH \times PPR \times Impact \times Eff \times Gap \times Key\ Driver\ \% \times (Sub\text{-}driver\ 1\% + Sub\text{-}driver\ 2\%),$$

Where

HH=Number of households, or 27,671,034
PPR=Point per Relationship, or 0.0000036
Impact=Percent of households impacted, or 67%
Eff=Estimated effectiveness of the project, or 50%
Gap=Current percent gap to benchmark, or 45.4%
Key Driver %=Percent associated with Checking key driver, or 29%
Sub-driver 1%=Percent associated with Customer Service, or 37%
Sub-driver 2%=Percent associated with Explanation of Features, or 32%.

Therefore $$Lift = 27,671,034 \times 0.0000036 \times 67\% \times 50\% \times 45.4\% \times 29\% \times (37\% + 32\%) = 3.03\ points\ of\ lift\ predicted.$$

If successful, the project is expected to lift overall satisfaction with the bank by 3 points. That is, the percent of customers who rate the bank as a 9 or 10 would be expected to increase by 3 percentage points as a result of this initiative.

While 3 percentage points may seem small, it represents over 800,000 households in this example that may now be much more likely to buy additional products, recommend the bank or business to acquaintances, and remain or become long-term customers. This may translate into millions of dollars of revenue for the bank or business.

Returning to method 100, in block 138 (FIG. 1D), short term goals to accomplish the vision or long term goal may be defined. To continue the example, annual customer delight goals based on the path to the vision or long term goal may be developed. Management may decide on the length of time that it should take to reach the long term goal for the objective.

In block 140, management by fact (MBF) using key drivers as root cause categories may be formed. Key drivers may become categories and efforts to determine root causes and countermeasures may be arranged by sub-level drivers. The MBF may be the management tool used to track countermeasures or improvement projects.

In block 142, root causes for the largest quantity of gap points (highest Pareto bars in FIG. 6) associated with sub-level drivers may be determined to provide the largest critical to quality (CTQ) opportunities or greatest opportunities to achieve goals toward the objective. In block 144, potential countermeasures, improvements or the like to root causes may be identified and projects related thereto defined.

In block 146, a benefit (financial or other benefit) toward the goal for the objective may be estimated for each project to prioritize and assign resources. A predictive lift benefit calculator may be used to estimate the benefit. The lift or increase in customer satisfaction may be similar to that described with respect to block 136. Benefits and costs may be weighted to prioritize countermeasures or improvement projects.

In block 148, projects may be selected for a portfolio that offer the greatest benefit for the cost. In block 150, project management aids may be generated, such as project worksheets, ladder charts and the like. In block 152, execution of each project may be managed. Each project may need to be shepherded through various funding and deployment tollgates through either conclusion or cancellation. In block 154, projects may be reviewed periodically for completion or cancellation. Resources for a cancelled project may then be freed and allocated to other projects.

In block 156, the benefits from each project may be measured and verified to "book" lift from each project. Benefits from each project are measured and verified so that the MBF can be updated and next-best opportunities exploited in block 158. This may be performed by measuring gap closure of the primary metric as well as improvement in scores relating to CTQs affected by the project, and performing mathematical analysis to assign actual lift to initiatives.

In block 160, the status of each project may be periodically reported to management or some other forum. In block 162, the inputs to the predictive impact calculator may be updated and the project management aids may be updated in block 164. Other management functions may be performed in block 166 to further manage achieving goals toward the objective. In block 168, periodic surveys may be deployed to determine performance against primary metric or measurement toward achieving the objective.

Figure 7:
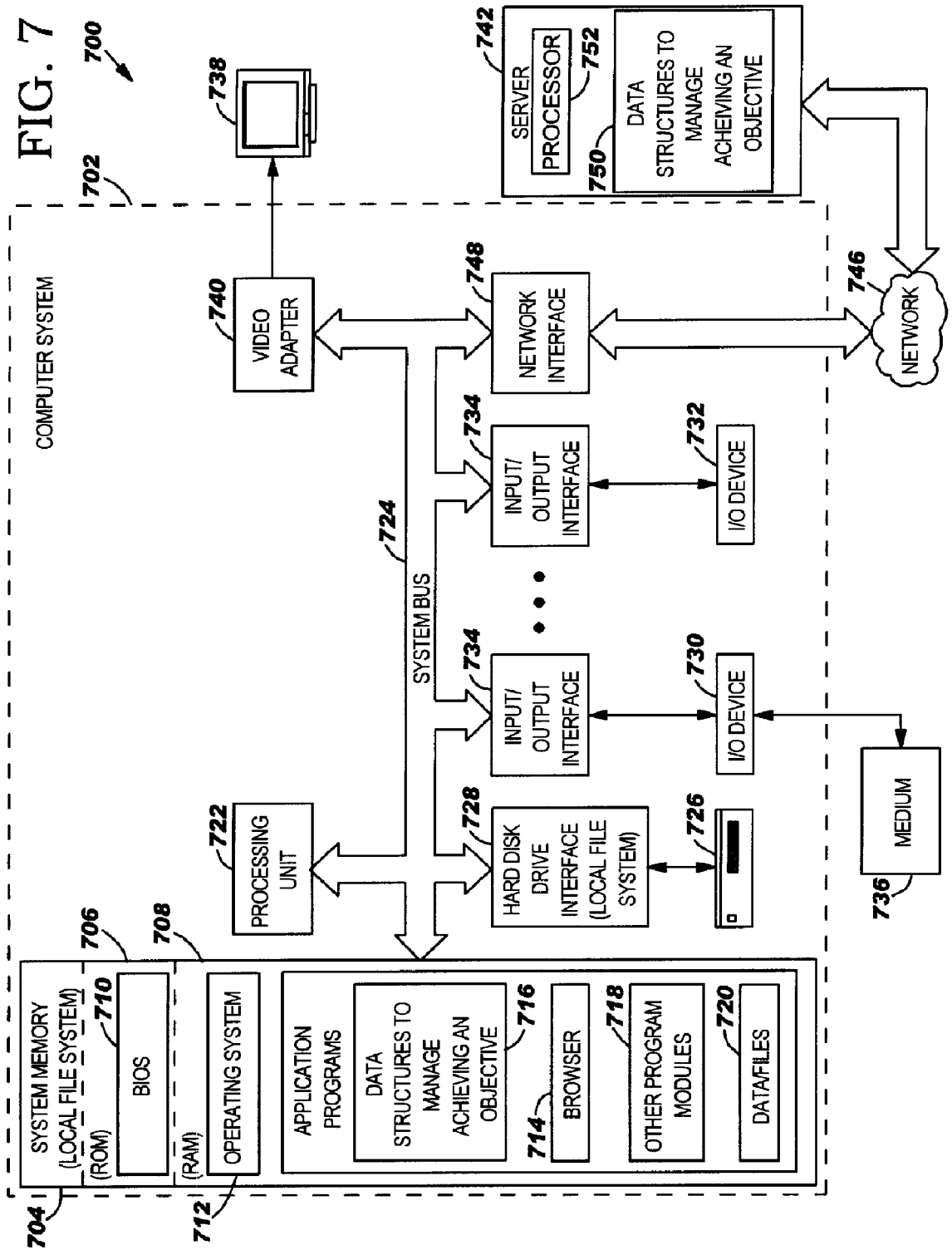
FIG. 7 is a block diagram of an exemplary system to manage achieving an objective in accordance with an embodiment of the present invention.

FIG. 7 is a block diagram of an exemplary system 700 to manage achieving an objective in accordance with an embodiment of the present invention. The elements of the method 100 may be embodied in and performed by the system 700. The system 700 may include a computer system 702 or similar system or device. The computer system 702 may also be a communications device, such as a cellular telephone, mobile computing system, personal digital assistant or similar device capable of browsing or accessing the Internet, private network, intranet or the like.

The computer system 702 may include a system memory or local file system 704. The system memory 704 may include a read only memory (ROM) 706 and a random access memory (RAM) 708. The ROM 706 may include a basic input/output system (BIOS) 710. The BIOS 710 may contain basic routines that help to transfer information between elements or components of the computer system 702. The RAM 708 may contain an operating system 712 to control overall operation of the computer system 702. The RAM 708 may also include a browser 714 or web browser. The RAM 708 may also include data structures 716 or computer-executable code to manage achieving an objective in accordance with an embodiment of the present invention that may be similar or include elements of the method 100 of FIG. 1. The RAM 708 may further include other application programs 718, other program modules, data 720, files and the like.

The computer system 702 may also include a processor or processing unit 722 to control operations of the other components of the computer system 702. The operating system 712, browser 714, data structures 716 and other program modules 720 may be operable on the processing unit 722. The processing unit 722 may be coupled to the memory system 704 and other components of the computer system 702 by a system bus 724.

The computer system 702 may also include a hard disk drive 726. The hard drive 726 may be coupled to the system bus 724 by a hard drive interface 728. The hard drive 726 may also form part of the local file system 704 or system memory. Programs, software and data may be transferred and exchanged between the system memory 704 and the hard drive 726 for operation of the computer system 702.

The computer system 702 may also include multiple input devices, output devices or combination input/output devices 730 and 732. Each input/output device 730 and 732 may be coupled to the system bus 724 by an input/output interface 734. The input and output devices or combination I/O devices 730 and 732 permit a user to operate and interface with the computer system 702 and to control operation of the browser 714 and data structures 716 for synchronizing content in multiple browser windows. The I/O devices 730 may include a keyboard and computer pointing device or the like to perform the operations discussed above.

The I/O devices 732 may include disk drives, optical, mechanical, magnetic, or infrared input/output devices, modems or the like. The I/O devices 732 may be used to access a medium 736. The medium 736 may contain, store, communicate or transport computer-readable or computer-executable instructions or other information for use by or in connection with a system, such as the computer system 702.

The computer system 702 may also include or be connected to a display or monitor 738. The monitor 738 may be coupled to the system bus 724 by a video adapter 740. The monitor 738 may be used to permit the user to interface with the computer system 702. The monitor 738 may present the charts represented in FIGS. 2-6 to a user that may be generated by the data structures 716 to manage achieving an objective such as customer delight or other objective.

The computer system 702 may communicate with a remote server 742 and may access other servers or URLs 744 or other computer systems (not shown) similar to computer system 702 via a network 746. The system bus 724 may be coupled to the network 746 by a network interface 748. The network interface 748 may be a modem, Ethernet card, router, gateway or the like for coupling to the network 746. The coupling may be a wired connection or wireless. The network 746 may be the Internet, private network, an intranet or the like.

In accordance with another embodiment of the present invention, the server 742 may also include data structures 750 to manage achieving an objective similar to method 100 of FIG. 1. Clients, such as computer system 702 or the like, may access the data structures 750 to manage achieving objectives via the network 546. The data structure 750 may operate on a processor 752.

Elements of the present invention, such as method 100 of FIGS. 1 and system 700 of FIG. 7, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in the medium for use by or in connection with a system, such as system 700 of FIG. 7. Examples of such a medium may be illustrated in FIG. 7 as network 746 or medium 736 and I/O devices 732. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network, such as the Internet or the like. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to manage achieving a customer service objective of a business, comprising:
    calculating, using a computer, a gap percentage for one or more satisfaction levels as a difference between a baseline and a respective goal for the satisfaction level;
    multiplying the gap percentage for the one or more satisfaction levels by a total number of customer relationships to determine a number of relationships per gap;
    identifying one or more drivers related to the one or more satisfaction levels;
    determining a total number of relationships that need to be moved to a different satisfaction level, comprising:
        multiplying each of the number of relationships per gap by an impact percentage associated with each driver related to the one or more satisfaction levels to determine a number of relationships that need to be moved to a different satisfaction level for each driver, wherein the impact percentage associated with each driver is based on how each driver contributes to each respective satisfaction level; and
        summing the number of relationships that need to be moved to a different satisfaction level for each driver to determine the total number of relationships that need to be moved; and
    planning initiatives to achieve the customer service objective of the business based on the number of relationships that need to be moved.

2. The method of claim 1, wherein the baseline comprises a percentage of customers associated with one or more satisfaction levels for the business.

3. The method of claim 1, wherein the determining the total number of relationships that need to be moved to a different satisfaction level further comprises:
    determining an index comprising a total number of points needed to achieve a level of satisfaction;
    determining a total amount of relationships that contributes some amount to the index; and
    calculating an amount of points for each driver by dividing the index by the total amount of relationships.

4. The method of claim 1, further comprising collecting data related to the customer service objective.

5. The method of claim 4, further comprising analyzing the data to differentiate potential customer actions based on customer responses to a survey, wherein the collecting data comprises deploying a survey to gather information regarding the one or more drivers.

6. The method of claim 4, further comprising analyzing the data to differentiate a customer propensity to purchase, recommend and close a relationship based on a customer level of satisfaction.

7. The method of claim 1, wherein the determining one or more drivers comprises determining the one or more drivers based on a Kano model.

8. The method of claim 1, wherein the determining one or more drivers comprises defining one or more drivers for a financial institution including at least one of deposit accounts, checking, credit card service, banking center, mortgage service, and problem resolution.

9. The method of claim 1, further comprising forming a predictive impact model based on improved performance of the drivers.

10. The method of claim 1, further comprising determining one or more sub-level drivers related to each driver.

11. The method of claim 10, further comprising analyzing a gap for each driver to associate a portion of the quantity of gap points contributable to each sub-level driver.

12. The method of claim 11, wherein analyzing a gap to associate a portion of the quantity of gap points contributable to each sub-level driver comprises performing a Pareto analysis using a point per relationship method.

13. The method of claim 12, further comprising forming a predictive impact model based on improved performance of the one or more sub-drivers.

14. The method of claim 11, further comprising identifying any improvements to close the portion of the quantity of gap points contributable to each sub-level driver, and implementing selected improvements.

15. The method of claim 14, further comprising at least one of:
    determining the one or more drivers and the one or more sub-drivers using a Kano model; and
    forming a predictive impact model based on improved performance of the one or more sub-drivers.

16. The method of claim 1, further comprising identifying any improvements to each driver, wherein the planning initiatives to achieve the customer service objective comprises implementing projects related to each improvement.

17. The method of claim 16, further comprising estimating a benefit of each project using a predictive impact calculator.

18. The method of claim 16, further comprising measuring a gap closure to determine any benefits.

19. The method of claim 1, further comprising defining the objective as moving a selected percentage of customers from at least one level of satisfaction to another level of satisfaction.

20. The method of claim 1,
wherein the customer service objective comprises managing a satisfaction level of customers with a company,
wherein the customer relationships comprise relationships with the customers of the company such that each relationship corresponds to one of the customers of the company,
wherein determining a total number of relationships that need to be moved to a different satisfaction level comprises determining a number of customers that should be moved from one level of satisfaction to a higher level of satisfaction.

21. The method of claim 1, wherein the determining a total number of relationships that need to be moved to a different satisfaction level comprises determining a total number of relationships to be moved from one level of satisfaction to a higher level of satisfaction by multiplying a population that makes up the gap times each percentage associated with drivers of delight so that each driver of delight has a population.

22. The method of claim 1, wherein at least one driver comprises a driver of delight and another driver comprises a driver of dissatisfaction.

23. A system to manage achieving a customer service objective of a business, comprising:
a computer processor;
an interface for collecting data related to the objective;
a module for calculating a gap percentage for one or more satisfaction levels as a difference between a baseline and a respective goal for the satisfaction level;
a module for multiplying the gap percentage for the one or more satisfaction levels by a total number of customer relationships to determine a number of relationships that constitute a gap;
a module for identifying one or more drivers related to the one or more satisfaction levels; and
a module for determining a total number of relationships that need to be moved to a different satisfaction level, comprising:
a module for multiplying each of the number of relationships per gap by an impact percentage associated with each driver related to the one or more satisfaction levels to determine a number of relationships that need to be moved to a different satisfaction level for each driver, wherein the impact percentage associated with each driver is based on how each driver contributes to each respective satisfaction level; and
a module for summing the number of relationships that need to be moved to a different satisfaction level for each driver to determine the total number of relationships that need to be moved.

24. The system of claim 23, wherein the baseline comprises a percentage of customers associated with one or more satisfaction levels for the business.

25. The system of claim 23, wherein the module for determining one or more drivers comprises a module for determining the one or more drivers based on a Kano model.

26. The system of claim 23, further comprising a module for determining one or more sub-level drivers related to each driver.

27. The system of claim 26, further comprising a module for analyzing a gap for each driver to associate a portion of the quantity of gap points contributable to each sub-level driver.

28. The system of claim 27, wherein the module for analyzing a gap for each driver to associate a portion of the quantity of gap points contributable to each sub-level driver comprises a data structure to perform a Pareto analysis using a point per relationship method.

29. The system of claim 23:
wherein the customer service objective comprises managing a satisfaction level of customers with a company,
wherein the customer relationships comprise relationships with the customers of the customers of the company such that each relationship corresponds to one of the customers of the company, and
wherein determining a total number of relationships that need to be moved to a different satisfaction level comprises determining a number of customers that should be moved from one level of satisfaction to a higher level of satisfaction.

30. The system of claim 23, wherein the interface for collecting data comprises a module for deploying a survey to gather information regarding the one or more drivers.

31. A computer-readable medium tangibly embodying computer executable instructions that, when executed by at least one computer, cause the at least one computer to perform the steps comprising:
collecting data related to a customer service objective;
calculating a gap percentage for one or more satisfaction levels as a difference between a baseline and a respective goal for the satisfaction level;
multiplying the gap percentage for the one or more satisfaction levels by a total number of customer relationships to determine a number of relationships per gap; and
identifying one or more drivers related to the one or more satisfaction levels; and
determining a total number of relationships that need to be moved to a different satisfaction level, comprising:
multiplying each of the number of relationships per gap by an impact percentage associated with each driver related to the one or more satisfaction levels to determine a number of relationships that need to be moved to a different satisfaction level for each driver, wherein the impact percentage associated with each driver is based on how each driver contributes to each respective satisfaction level; and
summing the number of relationships that need to be moved to a different satisfaction level for each driver to determine the total number of relationships that need to be moved.

32. The computer-readable medium of claim 31, wherein the steps further comprise differentiating potential customer actions based on customer responses to a survey.

33. The computer-readable medium of claim 31, wherein determining one or more drivers comprises determining the one or more drivers based on a Kano model.

34. The computer-readable medium of claim 31, wherein the steps further comprise determining one or more sub-level drivers related to each driver.

35. The computer-readable medium of claim 34, wherein the steps further comprise forming a predictive impact model based on improved performance of the one or more sub-drivers.

36. The computer-readable medium of claim 34, wherein the steps the computer executable instructions cause the at least one computer to perform further comprise analyzing the gap for each driver to associate a portion of the quantity of gap points contributable to each sub-level driver.

* * * * *

UNITED STATES PATENT AND TRADEMARK OFFICE
CERTIFICATE OF CORRECTION

| | | |
|---|---|---|
| PATENT NO. | : 7,725,345 B2 | |
| APPLICATION NO. | : 10/905135 | |
| DATED | : May 25, 2010 | |
| INVENTOR(S) | : Matthew Furin et al. | |

It is certified that error appears in the above-identified patent and that said Letters Patent is hereby corrected as shown below:

Title page, item (73), change the assignee from "Sony Ericsson Mobile Communications AB, Lund (SE)" to --Bank of America Corp., Charlotte, NC (US)--;

Column 3, line 51, change "standardize" to --standardized--;

Column 6, line 36, change "consists" to --consist--;

Column 8, line 65, change "consists" to --consist--;

Column 9, line 5, change "consists" to --consist--;

Column 9, line 29, change "Another" to --another--.

Signed and Sealed this

Twenty-sixth Day of October, 2010

David J. Kappos
*Director of the United States Patent and Trademark Office*